US012361813B2

(12) United States Patent
Takada et al.

(10) Patent No.: US 12,361,813 B2
(45) Date of Patent: Jul. 15, 2025

(54) SERVER DEVICE, VISITOR NOTIFICATION SYSTEM, VISITOR NOTIFICATION METHOD, AND STORAGE MEDIUM

(71) Applicant: NEC Corporation, Tokyo (JP)

(72) Inventors: Kanako Takada, Tokyo (JP); Kenichi Oosawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 296 days.

(21) Appl. No.: 18/029,465

(22) PCT Filed: Oct. 12, 2020

(86) PCT No.: PCT/JP2020/038479
§ 371 (c)(1),
(2) Date: Mar. 30, 2023

(87) PCT Pub. No.: WO2022/079762
PCT Pub. Date: Apr. 21, 2022

(65) Prior Publication Data
US 2023/0368639 A1 Nov. 16, 2023

(51) Int. Cl.
*G08B 21/22* (2006.01)
*G06V 10/94* (2022.01)
(Continued)

(52) U.S. Cl.
CPC .......... *G08B 21/22* (2013.01); *G06V 10/95* (2022.01); *G06V 20/625* (2022.01);
(Continued)

(58) Field of Classification Search
CPC ...... G08B 21/22; G06V 10/95; G06V 40/166; G06V 40/50; G06V 20/625; H04N 23/90
See application file for complete search history.

(56) References Cited

U.S. PATENT DOCUMENTS 7,366,645 B2 * 4/2008 Ben-Arie ................ G06F 3/011
703/2
8,706,552 B1 * 4/2014 Benjamin .......... G06Q 30/0252
705/14.5
(Continued)

FOREIGN PATENT DOCUMENTS

JP    H06-139263 A    5/1994
JP    H11-025306 A    1/1999
(Continued)

OTHER PUBLICATIONS

International Search Report for PCT Application No. PCT/JP2020/038479, mailed on Dec. 28, 2020.
(Continued)

*Primary Examiner* — Steven Lim
*Assistant Examiner* — Son M Tang

(57) ABSTRACT

A server device according to an aspect of the present disclosure includes: a database that stores visitor information including vehicle information of a vehicle used when a VIP visits and reception person information including information of a reception person; at least one memory storing a set of instructions; and at least one processor configured to execute the set of instructions to: determine whether a vehicle entering a parking lot is a vehicle carrying the VIP; acquire biological information on a person who has got off a vehicle, and stores the acquired biological information in the database as biological information on the VIP; and perform biometric authentication using biological information generated based on image data and biological information stored in the database, and when the authentication of the VIP who moves to a predetermined location is successful, notifies the reception person of the visit of the VIP.

14 Claims, 11 Drawing Sheets

(51) Int. Cl.
  *G06V 20/62* (2022.01)
  *G06V 40/16* (2022.01)
  *G06V 40/50* (2022.01)
  *H04N 23/90* (2023.01)

(52) U.S. Cl.
  CPC ............ *G06V 40/166* (2022.01); *G06V 40/50* (2022.01); *H04N 23/90* (2023.01)

(56) References Cited

U.S. PATENT DOCUMENTS

| | | | | |
|---|---|---|---|---|
| 9,730,068 | B2* | 8/2017 | Sundar | H04W 4/02 |
| 10,373,226 | B1* | 8/2019 | Russell | G06Q 30/0635 |
| 10,375,527 | B1* | 8/2019 | Price | H04W 4/12 |
| 2007/0056041 | A1* | 3/2007 | Goodman | H04L 9/3247 |
| | | | | 713/182 |
| 2007/0285504 | A1* | 12/2007 | Hesse | H04N 7/15 |
| | | | | 348/E7.083 |
| 2007/0285510 | A1* | 12/2007 | Lipton | G08B 13/19613 |
| | | | | 348/135 |
| 2008/0080748 | A1* | 4/2008 | Sukegawa | G06V 40/10 |
| | | | | 382/118 |
| 2009/0046153 | A1* | 2/2009 | Chen | G06V 20/52 |
| | | | | 348/E7.086 |
| 2009/0160660 | A1* | 6/2009 | Nurmela | G08B 21/0423 |
| | | | | 340/573.4 |
| 2011/0145053 | A1* | 6/2011 | Hashim-Waris | G16H 80/00 |
| | | | | 705/26.1 |
| 2012/0033031 | A1* | 2/2012 | Murphy | H04N 7/141 |
| | | | | 348/E7.083 |
| 2012/0066144 | A1* | 3/2012 | Berkvens | G06Q 10/00 |
| | | | | 705/345 |
| 2012/0310852 | A1* | 12/2012 | Ramalingamoorthy | G06Q 10/00 |
| | | | | 705/323 |
| 2015/0277409 | A1* | 10/2015 | Yamada | F24F 11/62 |
| | | | | 165/237 |
| 2016/0196702 | A1* | 7/2016 | Wilson | G07B 15/02 |
| | | | | 340/5.7 |
| 2016/0203699 | A1* | 7/2016 | Mulhern | G06V 20/52 |
| | | | | 340/573.1 |
| 2016/0217347 | A1* | 7/2016 | Mineo | A61B 5/441 |
| 2017/0228953 | A1* | 8/2017 | Lupovici | G07C 9/00896 |
| 2019/0311455 | A1* | 10/2019 | Miike | H04W 4/024 |
| 2020/0226416 | A1* | 7/2020 | Bapat | G08B 13/19645 |
| 2020/0233680 | A1 | 7/2020 | Ma et al. | |
| 2020/0234523 | A1* | 7/2020 | Ma | G08G 1/149 |
| 2020/0242851 | A1* | 7/2020 | Saikawa | G07C 9/28 |
| 2020/0322754 | A1* | 10/2020 | Soule | H04W 4/33 |
| 2021/0076007 | A1* | 3/2021 | Correnti | G06Q 50/16 |
| 2022/0172218 | A1* | 6/2022 | Nakahira | G06V 40/172 |
| 2023/0368639 | A1* | 11/2023 | Takada | G06Q 10/06 |
| 2025/0022372 | A1* | 1/2025 | Perrott | G08G 1/148 |

FOREIGN PATENT DOCUMENTS

| | | |
|---|---|---|
| JP | 2010-152784 A | 7/2010 |
| JP | 2019-186697 A | 10/2019 |
| JP | 2020-030647 A | 2/2020 |
| WO | 2018/198250 A1 | 11/2018 |

OTHER PUBLICATIONS

English translation of Written opinion for PCT Application No. PCT/JP2020/038479, mailed on Dec. 28, 2020.

* cited by examiner

Fig.4

REGISTRATION OF VISITOR

PLEASE PRESS REGISTRATION BUTTON
AFTER INPUTTING INFORMATION

VIP NAME

VEHICLE NUMBER

FIRST RECEPTION PERSON NAME

CONTACT INFORMATION OF FIRST RECEPTION PERSON

SECOND RECEPTION PERSON NAME

CONTACT INFORMATION OF SECOND RECEPTION PERSON

...

REGISTRATION

Fig.5

VISITOR DATABASE

| REGISTRATION ID | VISITOR INFORMATION |||| RECEPTION PERSON INFORMATION 1 || RECEPTION PERSON INFORMATION 2 || |
| --- | --- | --- | --- | --- | --- | --- | --- | --- | --- |
| | NAME | VEHICLE NUMBER | FACE IMAGE | FEATURE AMOUNT | NAME | CONTACT INFORMATION | NAME | CONTACT INFORMATION | |
| ID01 | VN01 | CN01 | F01 | FV01 | AN01 | AD01 | AN11 | AD11 | ⋮ |
| ID02 | VN02 | CN02 | F02 | FV02 | AN02 | AD02 | — | — | ⋮ |
| ⋯ | ⋯ | ⋯ | ⋯ | ⋯ | ⋯ | ⋯ | ⋯ | ⋯ | ⋯ |
| ID09 | VN09 | CN09 | — | — | AN09 | AD09 | — | — | ⋮ |

SERVER DEVICE, VISITOR NOTIFICATION SYSTEM, VISITOR NOTIFICATION METHOD, AND STORAGE MEDIUM

This application is a National Stage Entry of PCT/JP2020/038479 filed on Oct. 12, 2020, the contents of all of which are incorporated herein by reference, in their entirety.

TECHNICAL FIELD

The present invention relates to a server device, a visitor notification system, a visitor notification method, and a storage medium.

BACKGROUND ART

Large companies and the like have many guests. The guests include people who are very important to the company (so-called VIPs; Very Important Persons). Unlike general guests, such VIPs often visit by using vehicles and go from a dedicated parking lot to a meeting room or the like.

There are techniques related to handling VIP and techniques using vehicle numbers.

For example, the security system of PTL 1 includes a profile storage means that stores a customer profile for each customer, an authentication means that authenticates a customer who visits a store, and a control means. The control means determines an attendant suitable for the customer based on the profile stored in the profile storage means of the customer authenticated by the authentication means. The control means transmits information on the customer to a mobile terminal device carried by the determined attendant. The profile includes two or more of VIP, special customers, creamers, and shoplifters.

PTL 2 discloses a visitor detection system and a visitor detection method that detect a visitor to a facility such as a store and notify information on a plurality of persons related to the visitor. The system of PTL 2 includes a mobile terminal, a monitoring target database, an out-of-store camera, an in-store camera, a vehicle recognition unit, a person recognition unit, a notification content determination unit, and a notification unit. The mobile terminal is a terminal for displaying information on a visitor and notifying the visitor. Information for associating a plurality of persons as a group and an attribute for specifying the group are registered in the monitoring target database. The out-of-store camera and the in-store camera capture images for recognizing attributes. An attribute recognition unit (vehicle recognition unit, and person recognition unit) recognizes an attribute from an image captured by a camera. The notification content determination unit specifies a group based on the attribute recognized by the attribute recognition unit, and determines information on the constituent members of the group as the notification content. The notification unit displays the notification content determined by the notification content determination unit on the terminal to notify the visit of the group.

PTL 3 describes providing a store visit customer reception support device that supports a customer who visits a store with a vehicle so that the customer can receive a detailed reception including a proposal of a product or a service. The device of PTL 3 determines whether the customer who visits the store belongs to any category of a new customer, an existing customer who visits the store without reservation on the day, or an existing customer (reservation customer) who has reservation on the day, based on the plate number input from the character recognition device. The device creates and outputs a message requesting reception of the customer according to the determined classification.

PTL 4 describes providing a customer guidance system capable of providing a guidance service that has arrived even when a person in charge is relatively inexperienced and the number of customers is large. In the system of PTL 4, a vehicle number, a name, a company name, a title, and a posture image for each customer are stored in advance in a customer information storage unit. When a customer in an automobile arrives, a camera and an image processor read a vehicle number, and a controller reads relevant customer information from the customer information storage unit based on the vehicle number and displays the customer information on a display unit.

CITATION LIST

Patent Literature

PTL 1: WO 2018/198250 A
PTL 2: JP 2020-030647 A
PTL 3: JP 2010-152784 A
PTL 4: JP 6-139263 A

SUMMARY OF INVENTION

Technical Problem

It goes without saying that VIPs are important persons for companies, and when the VIPs come, they are required to receive them respectfully. That is, a situation in which a reception person is absent when a VIP visits is not allowed. However, it is useless for the reception person to wait far before the scheduled time when the VIP visits, and it is desired for the reception person to know the visit of the VIP at an appropriate timing. PTLs 1 to 4 does not disclose notifying the reception person of the visit of the VIP at an appropriate timing.

It is a main object of the present invention to provide a server device, a visitor notification system, a visitor notification method, and a storage medium that contribute to notifying the reception person of a visit of a VIP at an appropriate timing.

Solution to Problem

According to a first aspect of the present invention, there is provided a server device including: a database that stores visitor information including at least vehicle information of a vehicle used when a VIP visits and reception person information including at least information of a reception person who responds to the VIP in association with each other; a determination unit that determines whether a vehicle entering a parking lot is a vehicle carrying the VIP based on image data obtained from a first camera device and the vehicle information; an acquisition unit that acquires, by using image data obtained from a second camera device, biological information on a person who has got off a vehicle that has been determined to be a vehicle carrying the VIP, and stores the acquired biological information in the database as biological information on the VIP; and a notification unit that performs biometric authentication using biological information generated based on image data obtained from a third camera device and biological information stored in the database, and when the authentication of the VIP who moves to a predetermined location is successful, notifies the reception person relevant to the VIP who has succeeded in the authentication of the visit of the VIP.

According to a second aspect of the present invention, there is provided a visitor notification system including: first to third camera devices; and a server device connected to the first to third camera devices. The server device includes: a database that stores visitor information including at least vehicle information of a vehicle used when a VIP visits and reception person information including at least information of a reception person who responds to the VIP in association with each other; a determination unit that determines whether a vehicle entering a parking lot is a vehicle carrying the VIP based on image data obtained from the first camera device and the vehicle information; an acquisition unit that acquires, by using image data obtained from the second camera device, biological information on a person who has got off a vehicle that has been determined to be a vehicle carrying the VIP, and stores the acquired biological information in the database as biological information on the VIP; and a notification unit that performs biometric authentication using biological information generated based on image data obtained from the third camera device and biological information stored in the database, and when the authentication of the VIP who moves to a predetermined location is successful, notifies the reception person relevant to the VIP who has succeeded in the authentication of the visit of the VIP.

According to a third aspect of the present invention, there is provided a visitor notification method that is performed in a server device including a database to store visitor information including at least vehicle information of a vehicle used when a VIP visits and reception person information including at least information of a reception person who responds to the VIP in association with each other, the visitor notification method including: determining whether a vehicle entering a parking lot is a vehicle carrying the VIP based on image data obtained from a first camera device and the vehicle information; acquiring, by using image data obtained from a second camera device, biological information on a person who has got off a vehicle that has been determined to be a vehicle carrying the VIP, and storing the acquired biological information in the database as biological information on the VIP; and performing biometric authentication using biological information generated based on image data obtained from a third camera device and biological information stored in the database, and when the authentication of the VIP who moves to a predetermined location is successful, notifying the reception person relevant to the VIP who has succeeded in the authentication of the visit of the VIP.

According to a fourth aspect of the present invention, there is provided a non-transitory computer-readable storage medium storing a program for causing a computer installed in a server device including a database to store visitor information including at least vehicle information of a vehicle used when a VIP visits and reception person information including at least information of a reception person who responds to the VIP in association with each other, to execute: determining whether a vehicle entering a parking lot is a vehicle carrying the VIP based on image data obtained from a first camera device and the vehicle information; acquiring, by using image data obtained from a second camera device, biological information on a person who has got off a vehicle that has been determined to be a vehicle carrying the VIP, and storing the acquired biological information in the database as biological information on the VIP; and performing biometric authentication using biological information generated based on image data obtained from a third camera device and biological information stored in the database, and when the authentication of the VIP who moves to a predetermined location is successful, notifying the reception person relevant to the VIP who has succeeded in the authentication of the visit of the VIP.

Advantageous Effects of Invention

According to each aspect of the present invention, there are provided a server device, a visitor notification system, a visitor notification method, and a storage medium that contribute to notifying a reception person of a visit of a VIP at an appropriate timing. The effect of the present invention is not limited to the above. According to the present invention, other effects may be exhibited instead of or in addition to the effects.

BRIEF DESCRIPTION OF DRAWINGS

FIG. 4 is a diagram for explaining an operation of a pre-registration unit according to the first example embodiment.

FIG. 5 is a diagram illustrating an example of a visitor database according to the first example embodiment.

EXAMPLE EMBODIMENT

Figure 1:
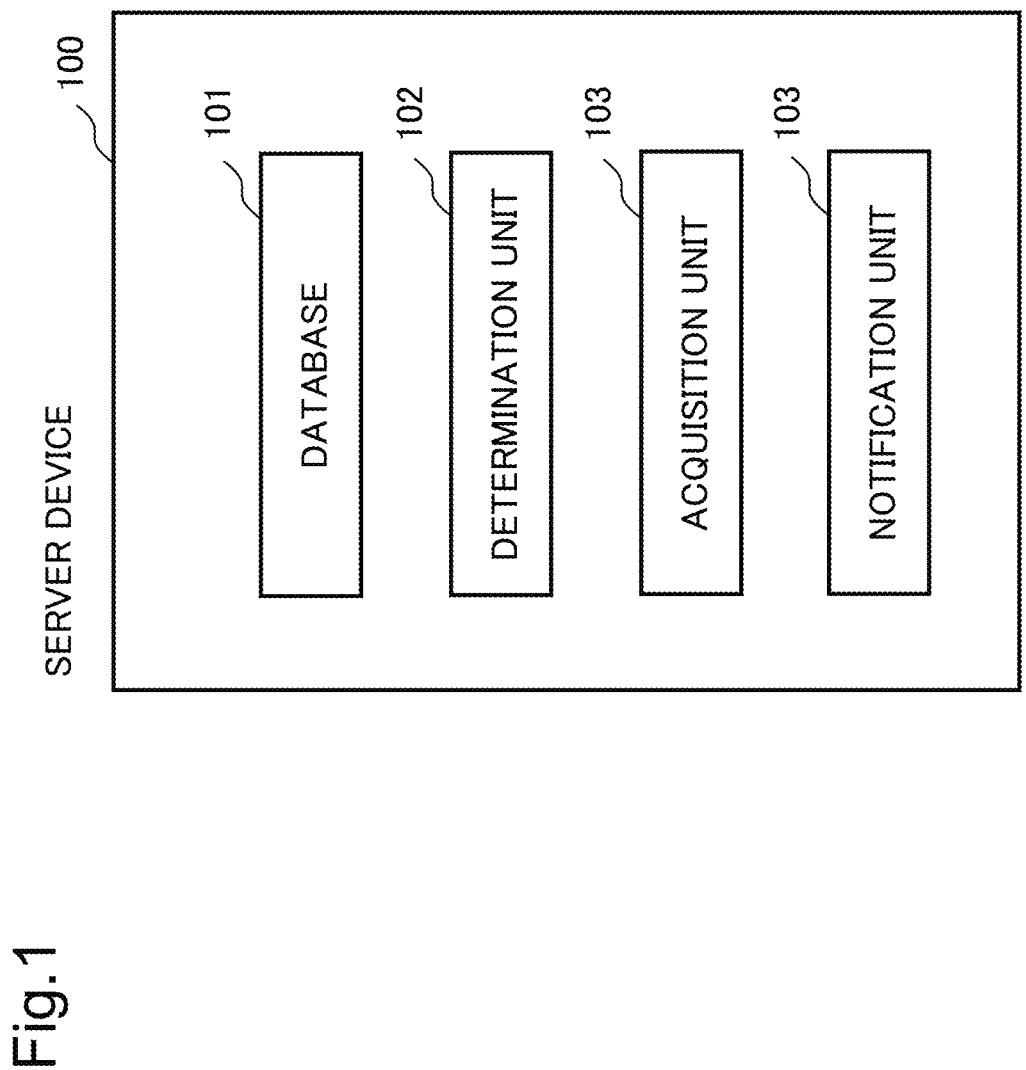
FIG. 1 is a diagram for explaining an outline of an example embodiment.

First, an outline of an example embodiment will be described. The reference numerals in the drawings attached to this outline are attached to each element for convenience as an example for assisting understanding, and the description of this outline is not intended to be any limitation. In a case where there is no particular explanation, the block described in each drawing represents not a configuration of a hardware unit but a configuration of a functional unit. Connection lines between blocks in each drawing include both bidirectional and unidirectional lines. The unidirectional arrow schematically indicates a flow of a main signal (data), and does not exclude bidirectionality. In the present specification and the drawings, elements that can be similarly described are denoted by the same reference numerals, and redundant description can be omitted.

A server device 100 according to the example embodiment includes a database 101, a determination unit 102, an acquisition unit 103, and a notification unit 104 (see FIG. 1). The database 101 stores at least visitor information including vehicle information of a vehicle used when a VIP visits and at least reception person information including information of a reception person who responds to a VIP in association with each other. The determination unit 102 determines whether the vehicle entering the parking lot is a vehicle carrying a VIP based on the image data and the vehicle information obtained from a first camera device. The acquisition unit 103 acquires biological information of a person who has exited the vehicle that has been determined as the vehicle carrying a VIP using the image data obtained from a second camera device, and at the same time stores the acquired biological information in the database 101 as the biological information of the VIP. The notification unit 104 performs biometric authentication by using the biological information generated based on image data obtained from a third camera device and the biological information stored in the database 101. When authentication of a VIP moving to a predetermined location has succeeded, the notification unit 104 notifies a reception person who responds to the VIP for which the authentication has succeeded, of the visit of the VIP.

The server device 100 determines whether a preregistered VIP visits by using vehicle information (for example, the number of the vehicle; vehicle registration number). When a person gets off a vehicle on which a VIP is boarding, the server device 100 acquires biological information (for example, a face image) of the person and registers the biological information in the database 101 as the biological information of the visited VIP. The server device 100 notifies the visit of the VIP to the reception person who attends to the VIP in response to the successful biometric authentication of the VIP who is moving from the parking lot to a conference location (predetermined location; a meeting room or the like). By installing the third camera device that photographs a moving VIP in an appropriate location, the reception person is notified of the visit of the VIP at an appropriate timing. As a result, the reception person does not need to wait at the conference location than necessary, and can go to the conference location. That is, the server device 100 can notify the reception person of the visit of the VIP at an appropriate timing.

Hereinafter, specific example embodiments will be described in more detail with reference to the drawings.

First Example Embodiment

Figure 2:
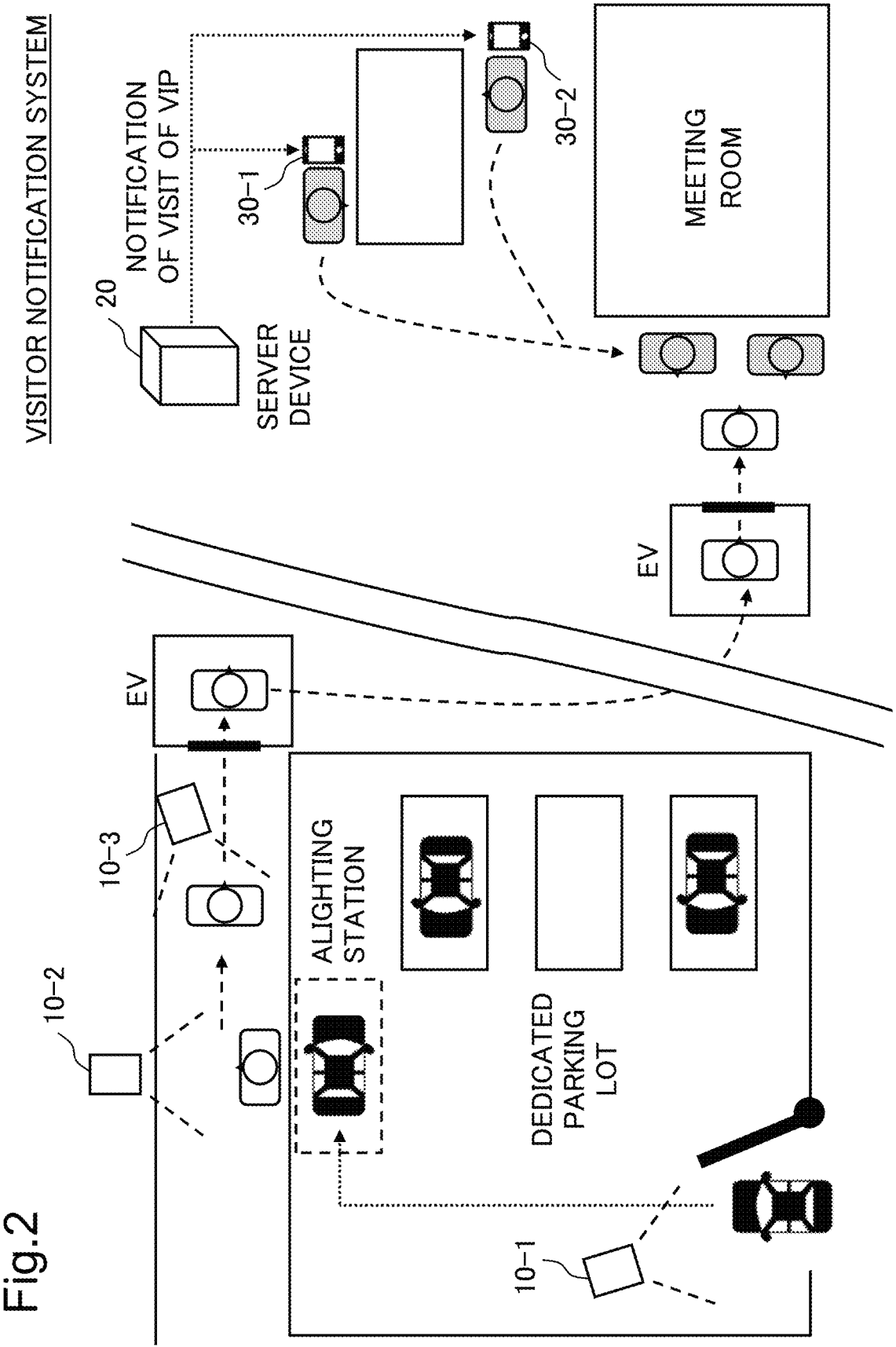
FIG. 2 is a diagram illustrating an example of a schematic configuration of a visitor notification system according to a first example embodiment.

A first example embodiment will be described in more detail with reference to the drawings.
[System Configuration]
FIG. 2 is a diagram illustrating an example of a schematic configuration of a visitor notification system according to the first example embodiment. Referring to FIG. 2, the visitor notification system includes a plurality of camera devices 10-1 to 10-3, a server device 20, and a plurality of terminals 30-1 and 30-2.

In the following description, when there is no particular reason to distinguish the camera devices 10-1 to 10-3, they are simply referred to as "camera device 10". Similarly, for other components, reference numerals on the left side separated by hyphens are used to represent the components.

The devices illustrated in FIG. 2 are connected to each other. For example, the camera device 10 and the server device 20 are connected by wired or wireless communication means, and are configured to be able to communicate with each other.

The visitor notification system illustrated in FIG. 2 operates in a company or the like having a parking lot dedicated to important persons (VIP) for the company or the like.

The plurality of camera devices 10 included in the visitor notification system are installed at various places in a dedicated parking lot and a building of a company.

For example, the camera device 10-1 is installed near the entrance of the dedicated parking. The camera device 10-1 is installed so as to be able to photograph a vehicle entering the dedicated parking lot. More specifically, the camera device 10-1 is installed so as to be capable of capturing the license plate of the entering vehicle.

The camera device 10-2 is installed so as to be capable of capturing an image of a person who gets off a vehicle stopped at an alighting station of a dedicated parking lot.

The camera device 10-3 is installed at a predetermined location between a dedicated parking lot and a meeting room (a meeting room for meeting with a VIP and the like). The camera device 10-3 is installed so as to be able to photograph a person passing through the predetermined location. That is, the camera device 10-3 is installed so as to be capable of capturing an image of a person passing through a route from an alighting station in a dedicated parking lot to a predetermined location.

The server device 20 detects the visit of a VIP using image data (still image data or moving image data) acquired from the camera device 10. When detecting that a VIP visits, the server device 20 transmits a "VIP visit notification" to the terminal 30 used by the reception person who attends to the VIP.

The server device 20 may be installed in a building which is provided with a dedicated parking lot, or may be installed on a network (on a cloud). The configuration illustrated in FIG. 2 is an example and is not intended to limit the configuration of the visitor notification system. A larger number of camera devices 10 than those illustrated in FIG. 2 may be installed, or a smaller number of camera devices 10 may be installed. For example, one camera device may play the roles of the camera device 10-2 and the camera device 10-3. The visitor notification system may include at least one or more terminals 30.

The biological information in the disclosure of the present application is a face image, a fingerprint image, an iris image, a vein image of a finger, a palm print image, a vein image of a palm, or the like. Alternatively, the biological information may be voice data (voiceprint) in which human voice is stored. The biological information may be one or a plurality of pieces of biological information. The term "biological information" in the disclosure of the present application means image data including all or a part of a living body, audio data, and a feature amount extracted from the image. In the first example embodiment, information regarding a person's face (face image, feature amount extracted from the face image) is treated as biological information and will be described.
[Outline of System Operation]
Next, an outline of an operation of the visitor system will be described with reference to the drawings.

A reception person who receives a VIP performs pre-registration in preparation for a visit of the VIP. Specifically, the reception person registers, in the server device 20, information regarding the VIP who visits (hereinafter, referred to as visitor information) and information regarding the reception person who visits the VIP (hereinafter, it is referred to as "reception person information").

The visitor information includes at least vehicle information of a vehicle used when a VIP visits. The vehicle information is information for identifying a vehicle, and for example, a vehicle number (vehicle registration number) is exemplified as the vehicle information. Alternatively, a combination of a vehicle manufacturer, a model name, a color, and the like may be used as the vehicle information. Any information can be used as the vehicle information as long as the information can identify the vehicle carrying the VIP. Hereinafter, the vehicle number will be treated as vehicle information and described.

The visitor information may include a name of a VIP, an affiliation company name, and the like in addition to the vehicle information.

The reception person information is information on a reception person who responds to a VIP. The reception person information includes contact information (for example, an e-mail address that can be received by the terminal 30 used by the reception person) of the reception person. Alternatively, the reception person information may include the name of the reception person, the department to which the reception person belongs, and the like.

The server device 20 stores the acquired visitor information and the acquired reception person information in association with each other in the "visitor database".

Each camera device 10 included in the visitor notification system photographs a predetermined area periodically or at a predetermined timing, and transmits image data to the server device 20.

After pre-registration by the reception person, when a VIP visits, the vehicle of the VIP enters the dedicated parking lot. The number of the vehicle appears in the image captured by the camera device 10-1.

The server device 20 acquires the vehicle number from the image data acquired from the camera device 10-1. The server device 20 searches the visitor database using the acquired vehicle number as a key. If the acquired vehicle number is registered in the visitor database, the server device 20 determines that the preregistered VIP has come.

The vehicle (the vehicle carrying the VIP) that has entered the dedicated parking lot moves to the alighting station. The vehicle stops at the alighting station, and the VIP gets off.

The image captured by the camera device 10-2 shows a person getting off the vehicle.

In a case where it is determined that a preregistered VIP has come from the image data obtained by capturing the vehicle entering the dedicated parking lot, the server device 20 recognizes a person appearing in the image data acquired from the camera device 10-2 as a VIP. In the example of FIG. 2, the white person is a VIP.

The server device 20 generates biological information (face image, feature amount) on a VIP from the image data acquired from the camera device 10-2, and stores the biological information in the visitor database.

The alighting VIP moves toward a meeting room or the like. In the example of FIG. 2, the VIP moves toward the meeting room by a route using an elevator.

The image captured by the camera device 10-3 shows a person moving in a passage or the like.

The server device 20 executes authentication processing (collation processing) using biological information (face image) included in the image data acquired from the camera device 10-3. Specifically, the server device 20 determines whether a face image of the same person as the acquired face image is registered in the visitor database.

If the acquired face image is registered in the visitor database, the server device 20 refers to the reception person information (the contact information field of the reception person) of the relevant entry, and transmits a "VIP visit notification" to the terminal 30 of the reception person who attends to the VIP.

The reception person who has confirmed the VIP visit notification goes to a meeting room where a meeting or the like with the VIP is held and waits for the arrival of the VIP. In the example of FIG. 2, a gray person is a reception person who attends to a VIP. The reception person moves to the meeting room before the VIP arrives, and respectfully receives the VIP.

The camera device 10-3 is installed at a location and a position where a VIP visit notification is transmitted so that the reception person can arrive at the meeting room before the VIP.

Next, details of each device included in the visitor notification system will be described.

[Server Device]

Figure 3:
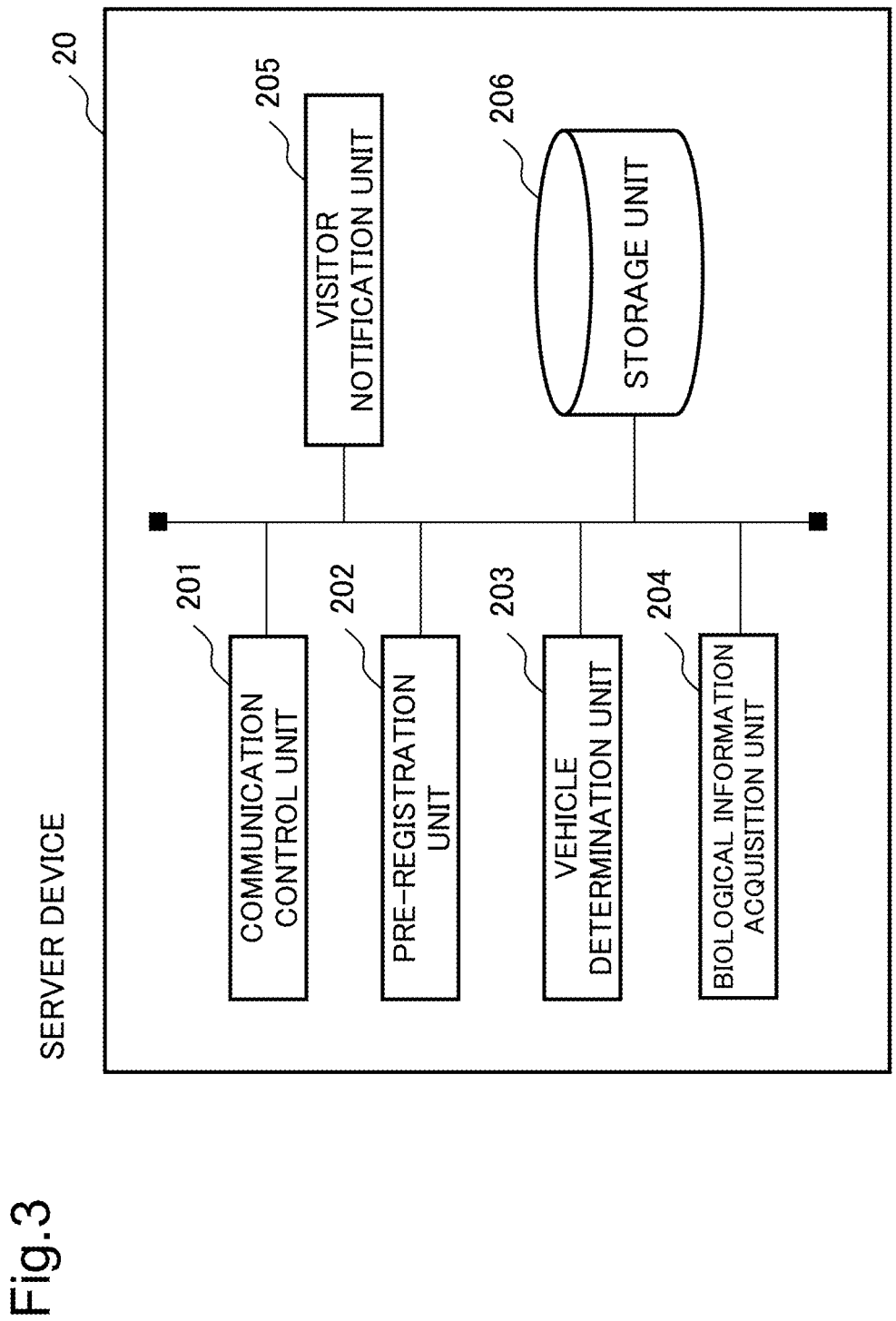
FIG. 3 is a diagram illustrating an example of a processing configuration of a server device according to the first example embodiment.

FIG. 3 is a diagram illustrating an example of a processing configuration (processing module) of the server device 20 according to the first example embodiment. Referring to FIG. 3, the server device 20 includes a communication control unit 201, a pre-registration unit 202, a vehicle determination unit 203, a biological information acquisition unit 204, a visitor notification unit 205, and a storage unit 206.

The communication control unit 201 is a means that controls communication with other devices. Specifically, the communication control unit 201 receives data (packet) from the camera device 10. The communication control unit 201 transmits data to the camera device 10. The communication control unit 201 delivers data received from another device to another processing module. The communication control unit 201 transmits data acquired from another processing module to another device. In this manner, the another processing module transmits and receives data to and from other devices via the communication control unit 201.

The pre-registration unit 202 is a means that achieves pre-registration regarding visit of VIP. The pre-registration unit 202 acquires information (visitor information) regarding the VIP who visits and information (reception person information) regarding the reception person who visits the VIP using an arbitrary method.

For example, the pre-registration unit 202 acquires information using a GUI or a form for inputting the information. For example, the pre-registration unit 202 displays an information input form as illustrated in FIG. 4 on the terminal 30 used by the reception person.

As illustrated in FIG. 4, the pre-registration unit 202 acquires a name of a VIP, a vehicle number used for visiting the VIP, and the like as visitor information. The pre-registration unit 202 acquires a name, a contact information (a contact information such as an e-mail address), and the like of a reception person who attends to the VIP as the reception person information. When a plurality of staff members are in charge of reception of VIPs, information on the plurality of reception persons is input.

FIG. 4 is an example and is not intended to limit the information acquired by the pre-registration unit 202. For example, when a plurality of VIPs visit one vehicle, the pre-registration unit 202 may acquire names and the like of the plurality of VIPs.

The visitor information and the reception person information may be input by an employee or the like other than the reception person who receives the VIP. For example, in a case where an officer or the like of a company who receives VIPs serves as a reception person, a secret of the officer may input the visitor information and the reception person information. Consistency between the name of the reception person and the contact information may not be obtained. In the above example, the name of the officer may be input as the name of the reception person, and the contact information of the assistant may be input as the contact information of the reception person.

The pre-registration unit 202 stores the acquired visitor information and the acquired reception person information in the "visitor database". The pre-registration unit 202 adds a new entry to the visitor database and registers the acquired information.

FIG. 5 is a diagram illustrating an example of a visitor database. As illustrated in FIG. 5, the visitor database includes a registration ID field, a field for storing the name of a VIP, a vehicle number, and biological information (face image, feature amount), and a field for storing the name and contact information of a reception person.

The registration ID field is information for identifying an entry in the visitor database. The pre-registration unit 202 assigns a registration ID each time a new entry is added, and sets the registration ID in the registration ID field.

When a new entry is registered in the visitor database, no biological information on the visitor (VIP) is acquired, and thus nothing is set in the face image field or the feature amount field.

The vehicle determination unit 203 is a means that determines whether the vehicle entering the dedicated parking lot is a vehicle carrying the VIP based on the image data obtained from the camera device 10-1 and the vehicle information (vehicle number). That is, the vehicle determination unit 203 determines whether the vehicle entering the dedicated parking lot is a vehicle on which a VIP registered in advance boards.

When acquiring the image data from the camera device 10-1, the vehicle determination unit 203 attempts to extract a vehicle number from the image data. Specifically, the vehicle determination unit 203 attempts to extract the vehicle number from the image data using a technique such as template matching.

When the extraction of the vehicle number is successful, the vehicle determination unit 203 searches the visitor database using the acquired vehicle number as a key, and determines whether the vehicle number is registered in the visitor database.

If the vehicle number is not registered in the visitor database, the vehicle determination unit 203 does not take any particular action. In this case, the response to the vehicle entering the dedicated parking lot is performed not by the visitor notification system but by another method.

If the vehicle number is registered in the visitor database, the vehicle determination unit 203 determines that the preregistered VIP has come. In this case, the vehicle determination unit 203 notifies the biological information acquisition unit 204 of the registration ID of the relevant entry. In the example of FIG. 5, when the vehicle number "CN01" is extracted from the image data, the registration ID "ID01" is notified to the biological information acquisition unit 204.

As described above, when the image data obtained from the camera device 10-1 includes the vehicle number stored in the visitor database, the vehicle determination unit 203 determines that the vehicle entering the dedicated parking lot is a vehicle carrying a VIP.

The biological information acquisition unit 204 is a means that acquires, by using the image data obtained from the camera device 10-2, biological information on a person who has got off the vehicle determined to be a vehicle carrying a VIP. The biological information acquisition unit 204 stores the acquired biological information in the visitor database as the biological information of a VIP.

The biological information acquisition unit 204 attempts to extract a face image from the image data transmitted from the camera device 10-2 periodically or at a predetermined timing. Specifically, the biological information acquisition unit 204 determines whether a face image of a person is included in the acquired image data, and extracts the face image from the acquired image data when the face image is included.

Since an existing technology can be used for the face image detection processing and the face image extraction processing by the biological information acquisition unit 204, detailed description thereof will be omitted. For example, the biological information acquisition unit 204 may extract a face image (face area) from the image data by using a learning model learned by a convolutional neural network (CNN). Alternatively, the biological information acquisition unit 204 may extract the face image using a method such as template matching.

The biological information acquisition unit 204 generates a feature amount (feature vector) from the extracted face image. An existing technology can be used for the feature amount extraction processing, and thus a detailed description thereof will be omitted. For example, the biological information acquisition unit 204 extracts eyes, a nose, a mouth, and the like as feature points from the face image. Thereafter, the biological information acquisition unit 204 calculates the position of each feature point and the distance between the feature points as feature amounts, and generates a feature vector (vector information characterizing the face image) including a plurality of feature amounts.

The biological information acquisition unit 204 registers the acquired biological information of the VIP (face image, feature amount) in the entry of the registration ID acquired from the vehicle determination unit 203 (entry of the visitor database).

The visitor notification unit 205 is a means that notifies the reception person of the visit of the VIP. When the authentication of the VIP succeeds, the visitor notification unit 205 notifies the reception person of the visit of the VIP. More specifically, the visitor notification unit 205 performs biometric authentication by using the biological information generated based on the image data obtained from the camera device 10-3 and the biological information stored in the visitor database. When authentication of a VIP moving to a predetermined location such as a meeting room has succeeded, the visitor notification unit 205 notifies the reception person who responds to the VIP for which the authentication has succeeded, of the visit of the VIP.

The visitor notification unit 205 attempts to extract a face image from the image data transmitted from the camera device 10-3 periodically or at a predetermined timing. The visitor notification unit 205 determines whether a face image of a person is included in the acquired image data, and extracts the face image from the acquired image data when the face image is included.

When the extraction of the face image is successful, the visitor notification unit 205 executes authentication processing (collation processing) using the extracted face image.

Specifically, the visitor notification unit 205 generates a feature amount from the face image. The visitor notification unit 205 sets the generated feature amount as a feature amount on the collation side and a feature amount registered in the visitor database as a feature amount on the registration side, and performs 1-to-N collation (N is a positive integer, and the same applies hereinafter).

The visitor notification unit 205 calculates similarity between the feature amount of the collation target and each of the plurality of feature amounts on the registration side. A chi-square distance, a Euclidean distance, or the like can be used as the similarity. The similarity is lower as the distance is longer, and the similarity is higher as the distance is shorter.

The visitor notification unit 205 determines whether there is a feature amount having a similarity with the feature amount of the collation target equal to or more than a predetermined value among the plurality of feature amounts registered in the visitor database. If such a feature amount does not exist, the visitor notification unit 205 does not perform any particular operation until another image data is acquired from the camera device 10-2. When acquiring new image data from the camera device 10-2, the visitor notification unit 205 performs authentication processing of a VIP using the image data.

If there is the feature amount as described above, the visitor notification unit 205 determines that the authentication of the VIP is successful. When the authentication succeeds, the visitor notification unit 205 specifies an entry having a feature amount with the highest similarity among the entries of the visitor database. The visitor notification unit 205 transmits a "VIP visit notification" to the contact information set in the contact field (the contact information field of the reception person) of the specified entry.

Specifically, the visitor notification unit 205 transmits a VIP visit notification to the terminal 30 used by the reception person or the like. The reception person who has come in contact with the notification goes to a meeting room where the reception person has a meeting with a VIP.

The storage unit 206 is a means that stores information necessary for the operation of the server device 20. In the storage unit 206, a visitor database is constructed. The visitor database stores therein visitor information including at least vehicle information on a vehicle used by a VIP for visiting and at least reception person information including information on a reception person who responds to the VIP in association with each other.

[Camera Device]

Detailed description of the camera device 10 is omitted. A general-purpose web (WEB) camera or the like can be used as the camera device 10.

[Terminal]

The terminal 30 may include a display device such as a liquid crystal panel and an operation device such as a touch panel, and may have an information output function and an information input function. The terminal 30 can be realized by a commercially available computer or the like, and an internal processing configuration and the like are obvious to those skilled in the art, and thus the description thereof will be omitted. Examples of the terminal 30 include a mobile terminal device such as a smartphone, a mobile phone, a game machine, and a tablet, a computer (personal computer, notebook computer), and the like.

[Operation of Visitor Notification System]

Next, an operation of the visitor notification system according to the first example embodiment will be described. Here, the operation of the server device 20 will be mainly described with reference to FIG. 6.

Figure 6:
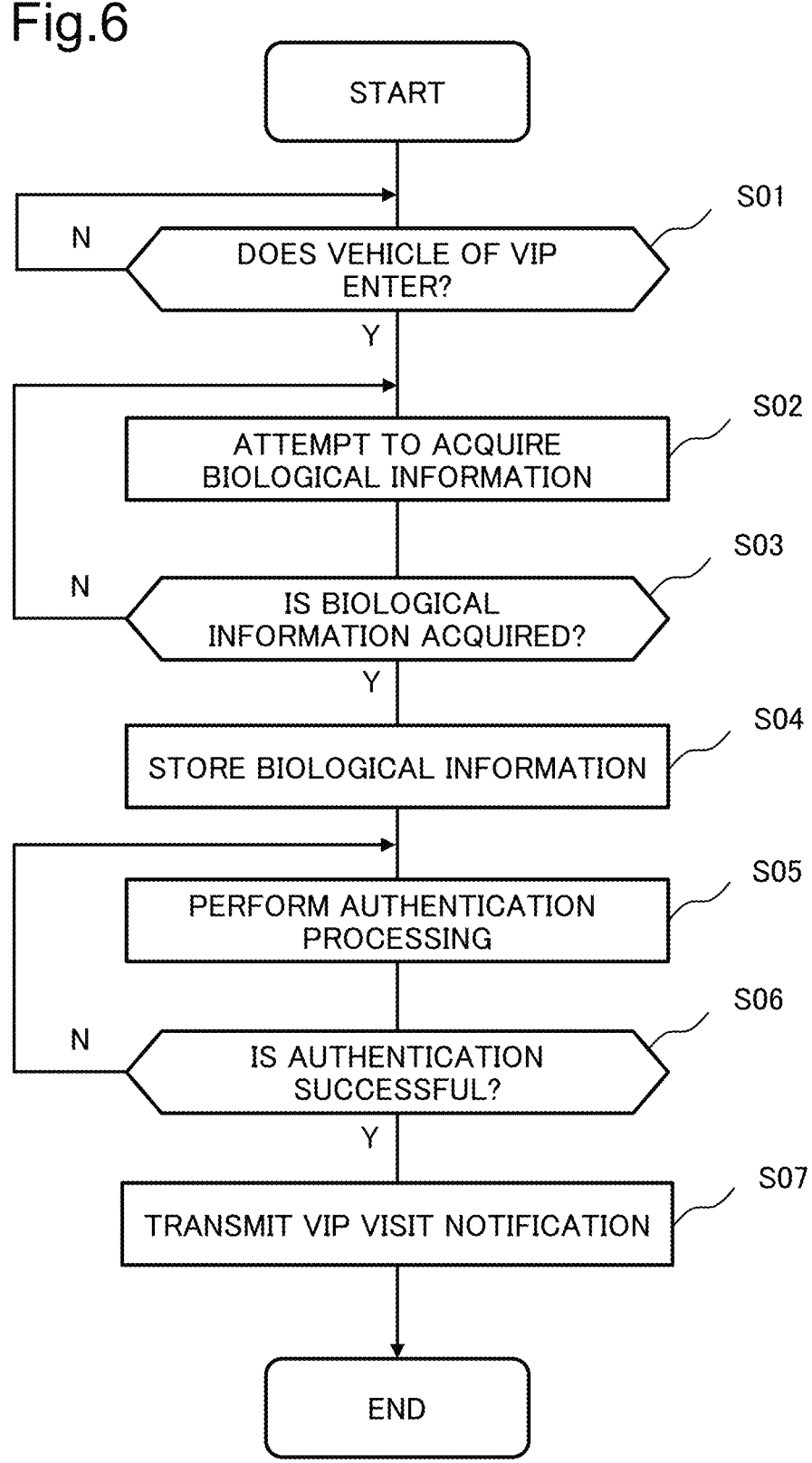
FIG. 6 is a flowchart illustrating an example of operation of the server device according to the first example embodiment.

FIG. 6 is a flowchart illustrating an example of the operation of the server device 20 according to the first example embodiment. Prior to the operation of FIG. 6, it is assumed that pre-registration regarding the visit of a VIP is performed in advance.

The server device 20 acquires image data from the camera device 10-1 periodically or at a predetermined timing. The server device 20 analyzes the image data and determines whether the vehicle carrying the VIP has entered the dedicated parking lot (step S01).

If no VIP vehicle is entered (Step S01, No branch), the server device 20 repeats the operation in step S01.

If a VIP vehicle is entered (Step S01, Yes branch), the server device 20 attempts to acquire biological information (face image) of the VIP based on the image obtained from the camera device 10-2 (step S02).

When the biological information is not able to be acquired (Step S03, No branch), the server device 20 repeats the processing of step S02.

When the biological information can be acquired (Step S03: Yes branch), the server device 20 stores the face image extracted from the image data and the feature amount generated from the face image in the visitor database (storing of biological information; Step S04).

The server device 20 performs authentication processing of the VIP using the image data obtained from the camera device 10-3 (step S05).

If the authentication of the VIP fails (Step S06, No branch), the server device 20 repeats the processing of step S05.

When the authentication of the VIP is successful (Step S06: Yes branch), the server device 20 transmits a VIP visit notification to the reception person who attends to the VIP (the terminal 30 used by the reception person or the like) (step S07).

When the processing of acquiring the biological information of a VIP (Steps S02 and S03) or the processing of authenticating a VIP (Steps S05 and S06) is not successful for a predetermined period, the server device 20 ends the series of processing. Alternatively, the server device may notify the reception person of the occurrence of such an abnormal situation (the biological information of a VIP is not able to be acquired even though the VIP's vehicle has entered, or the authentication of a VIP is not successful). That is, when the biological information acquisition unit 204 is not able to acquire the biological information of a person who gets off the vehicle determined as the vehicle carrying the VIP, the biological information acquisition unit may notify the reception person of the occurrence of an abnormal situation. Alternatively, when authentication of a VIP who moves to a predetermined location is not successful, the visitor notification unit 205 may notify the reception person of occurrence of an abnormal situation.

As described above, in the visitor notification system according to the first example embodiment, an employee of a company who receives a VIP visit registers information regarding the VIP visit in the server device in advance. The server device 20 analyzes the image obtained from the camera device 10-1, and grasps that the vehicle carrying the VIP has entered the dedicated parking lot. Further, when a person gets off a vehicle on which a VIP is on board, the server device 20 acquires a face image of the person and registers the face image in the visitor database as biological information of the visited VIP. In response to the successful biometric authentication of the VIP who moves from the dedicated parking lot to the meeting location, the server device 20 notifies the reception person of the VIP of the visit of the VIP. In the first example embodiment, by installing the camera device 10-3 that captures an image of a VIP who is moving at an appropriate location, the reception person is notified of the visit of the VIP at an appropriate timing. As a result, the reception person does not need to wait at the conference location than necessary, and can go to the conference location.

Figure 7:
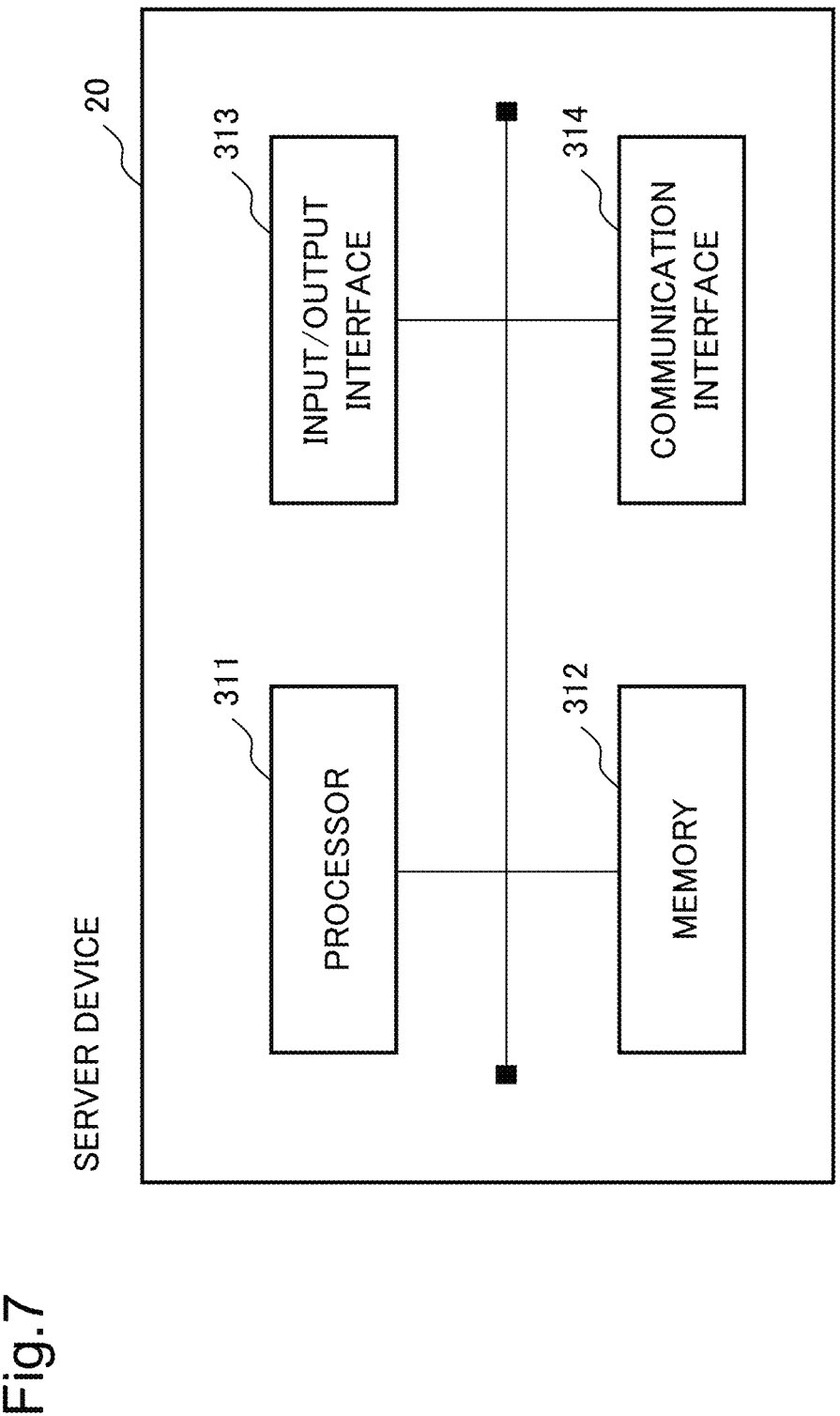
FIG. 7 is a diagram illustrating an example of a hardware configuration of a server device.

Next, hardware of each device constituting an entrance/exit management system will be described. FIG. 7 is a diagram illustrating an example of a hardware configuration of the server device 20.

The server device 20 can be configured by an information processing device (so-called computer), and has the configuration illustrated in FIG. 7. For example, the server device 20 includes a processor 311, a memory 312, an input/output interface 313, a communication interface 314, and the like. The components such as the processor 311 are connected by an internal bus or the like, and are configured to be able to communicate with each other.

However, the configuration illustrated in FIG. 7 is not intended to limit the hardware configuration of the server device 20. The server device 20 may include hardware (not illustrated) or may not include the input/output interface 313 as necessary. The number of processors 311 and the like included in the server device 20 is not limited to the example of FIG. 7, and for example, a plurality of processors 311 may be included in the server device 20.

The processor 311 is a programmable device such as a central processing unit (CPU), a micro processing unit (MPU), or a digital signal processor (DSP). Alternatively, the processor 311 may be a device such as a field programmable gate array (FPGA) or an application specific integrated circuit (ASIC). The processor 311 is configured to execute various program including an operating system (OS).

The memory 312 is a random access memory (RAM), a read only memory (ROM), a hard disk drive (HDD), a solid state drive (SSD), or the like. The memory 312 stores an OS program, an application program, and various data.

The input/output interface 313 is an interface of a display device or an input device (not illustrated). The display device is, for example, a liquid crystal display or the like. The input device is, for example, a device that receives a user operation such as a keyboard or a mouse.

The communication interface 314 is a circuit, a module, or the like that communicates with another device. For example, the communication interface 314 includes a network interface card (NIC) or the like.

The functions of the server device 20 are achieved by various processing modules. The processing module is achieved, for example, by the processor 311 executing a program stored in the memory 312. The program can be recorded in a computer-readable storage medium. The storage medium may be a non-transient (non-transitory) medium such as a semiconductor memory, a hard disk, a magnetic recording medium, or an optical recording medium. That is, the present invention can also be embodied as a computer program product. The program can be downloaded via a network or updated using a storage medium storing the program. Further, the processing module may be achieved by a semiconductor chip.

The server device 20 is equipped with a computer, and the function of the server device 20 can be achieved by causing the computer to execute a program. The server device 20 executes the visitor notification method by the program.

MODIFICATION

The configuration, operation, and the like of the visitor notification system described in the above example embodiment are merely examples, and are not intended to limit the configuration and the like of the system.

Figure 8:
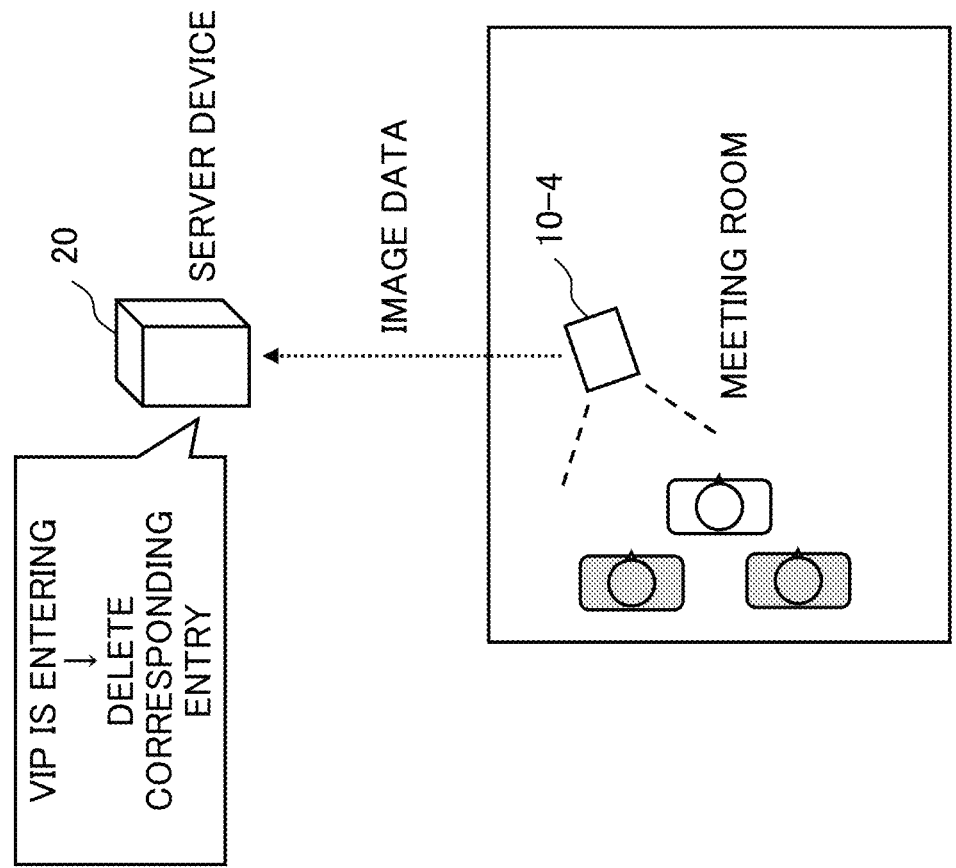
FIG. 8 is a diagram illustrating an example of a configuration of a visitor notification system according to a modification of the disclosure of the present application.
Figure 9:
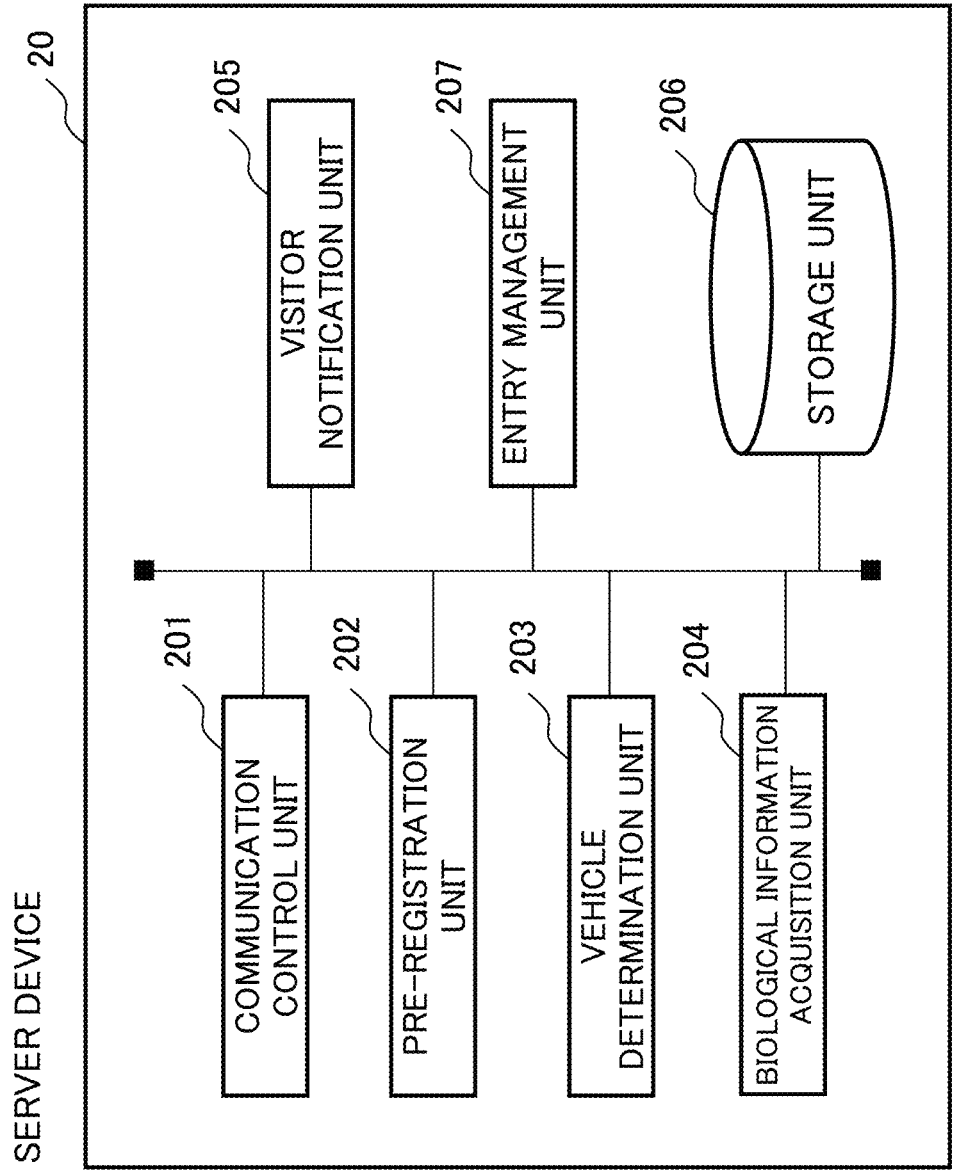
FIG. 9 is a diagram illustrating an example of a processing configuration of a server device according to a modification of the disclosure of the present application.

In the above example embodiment, it has been described that the biological information of the VIP is registered in the visitor database in response to the VIP getting off the vehicle. The biological information of VIPs or information regarding VIP visits (entry of the database) registered in the database may be deleted in response to arrival of VIPs at a meeting room or the like. For example, as illustrated in FIG. 8, a camera device 10-4 is installed inside a meeting room. The server device 20 attempts to extract a face image from the image data acquired from the camera device 10-4. When the face image is extracted, the server device 20 performs the collation processing using the face image and the face image registered in the visitor database. When the server device 20 determines that a VIP has entered the meeting room by the collation processing, the server device deletes the relevant entry in the visitor database. With such a response, it is possible to shorten the time during which the biological information (face image, feature amount) of the VIP is stored in the database, and thus, it is possible to enhance safety against leakage of personal information and the like. In this case, the server device 20 only needs to include an entry management unit 207 that executes the above-described function (authentication function and entry deletion function) (see FIG. 9). The entry management unit 207 deletes the entry of the visitor database relevant to the VIP who has arrived at the meeting room or the like. More specifically, the entry management unit 207 determines whether the VIP has arrived at a predetermined location by biometric authentication using biological information generated based on image data obtained from the camera device 10-4 and biological information stored in the visitor database.

Alternatively, the server device 20 (entry management unit 207) may delete the entry relevant to the visited VIP in response to transmitting the VIP visit notification to the terminal 30. Alternatively, the server device 20 may delete (clear) the "reception person information" in the visitor database in response to the arrival of the VIP at the meeting room or the transmission of the VIP visit notification. In other words, the visitor information in which the vehicle number and the biological information of the VIP (face image, feature amount) are associated with each other may be continuously stored in the database without being deleted even after the VIP visit. In this case, in preparation for information leakage or the like, it is desirable that the server device 20 take a measure such as encrypting visitor information.

When the entry relevant to the VIP is not deleted even if the VIP enters the meeting room or the like, the server device 20 may transmit a predetermined message to the reception person relevant to the VIP who has left after the meeting or the like. For example, the server device 20 analyzes the image data obtained from a camera device attached to an exit of a dedicated parking lot, and recognizes that a VIP vehicle has left the parking slot. The server device 20 may transmit, to the terminal 30 of the reception person, a message prompting the person to show gratitude to the VIP for the visit after a predetermined time has elapsed from the exit of the vehicle.

Figure 10:
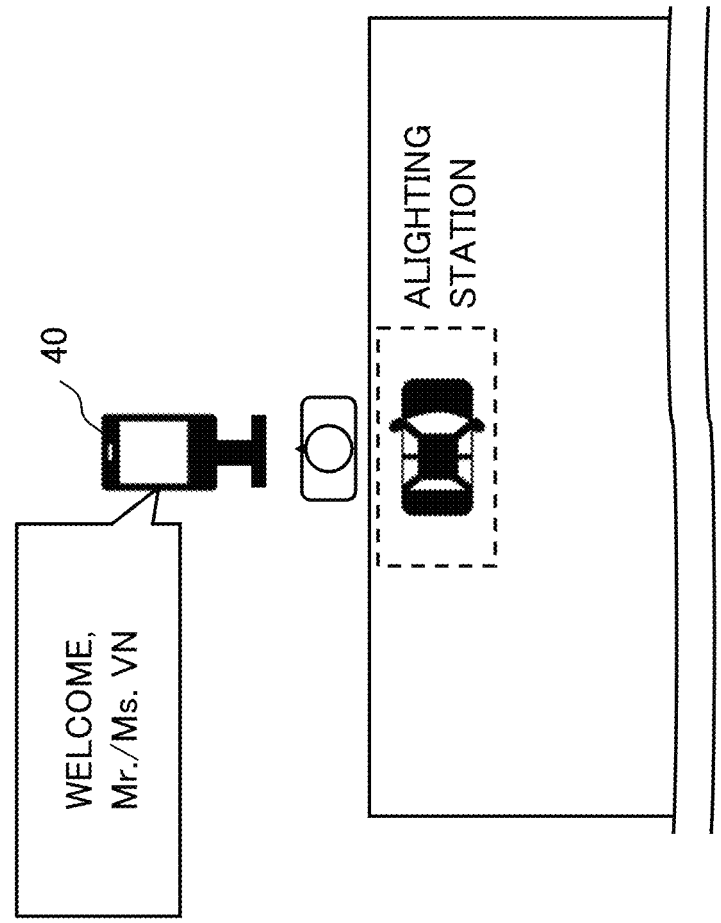
FIG. 10 is a diagram for explaining an operation of signage according to a modification of the disclosure of the present application.

The visitor notification system may include a signage 40 for providing information to VIPs or the like. As illustrated in FIG. 10, the signage 40 is installed at a location where the eyes of a VIP who gets off the vehicle are conspicuous. When the server device 20 detects that the vehicle carrying the VIP enters the dedicated parking lot based on the vehicle number, the server device may transmit information including the name and the like of the VIP associated with the vehicle number to the signage 40. The signage 40 may display a message welcoming a VIP to visit based on the acquired information or the like. In this case, when the biological information of the person (VIP) getting off the vehicle is successfully acquired, the biological information acquisition unit 204 reads the name and the like of the VIP from the entry relevant to the registration ID notified from the vehicle determination unit 203, and transmits the name and the like to the signage 40. In this manner, the visitor database may store the vehicle number and the personal information (name or the like) of the VIP who visits in association with each other. Further, when the biological information acquisition unit 204 can acquire the biological information of the person who gets off the vehicle determined as the vehicle carrying the VIP, the biological information acquisition unit may transmit the personal information of the VIP relevant to the vehicle carrying the VIP to the signage 40.

The reception person or the like may also register information such as a conference location at the time of pre-registration in preparation for VIP's visit. For example, the reception person may register the name of the meeting room, the scheduled meeting time, and the like in the server device 20 together with the visitor information and the reception person information. In this case, the server device 20 (biological information acquisition unit 204) may transmit information regarding a conference with a VIP (for example, the name of the meeting room, the way to the meeting room, the number of floors where the meeting room is located, and the like) to the signage 40. The signage 40 may display guidance or the like related to the conference location based on the acquired information. In this manner, the visitor database may store the visitor information and the reception person information in association with information regarding a predetermined location such as a meeting room. Further, when the biological information acquisition unit 204 can acquire the biological information of the person who gets off the vehicle determined as the vehicle carrying the VIP, the biological information acquisition unit may transmit information regarding a meeting room or the like relevant to the vehicle carrying the VIP to the signage 40.

Figure 11:
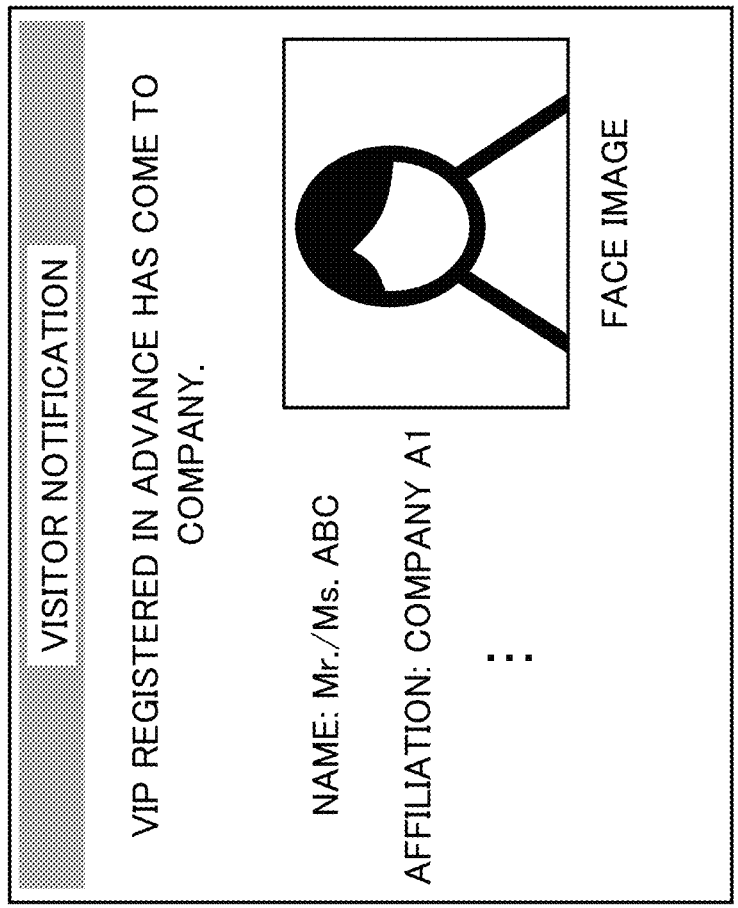
FIG. 11 is a diagram for explaining an operation of a terminal according to a modification of the disclosure of the present application.

The server device 20 (visitor notification unit 205) may transmit a VIP visitor notification including biological information and attribute information (for example, names, affiliated organizations, and the like) of the visited VIP to the terminal 30. The terminal 30 may display a face image of a VIP or the like in response to reception of the VIP visit notification (see FIG. 11). When a reception person who the VIP has met for the first time is included, the reception person can correctly recognize the visited VIP from the displayed face image.

When the authentication of the VIP based on the image data acquired from the camera device 10-3 is successful, the server device 20 may transmit the VIP visit notification to the terminal 30 after a predetermined period has elapsed instead of immediately transmitting the VIP visit notification to the terminal 30. That is, the server device 20 may change the timing of transmitting the VIP visit notification according to the moving time (moving time of the VIP) from the installation position of the camera device 10-3 to the conference location. For example, when a conference with a VIP is held at a location close to the installation location of the camera device 10-3, the server device 20 immediately transmits a VIP visit notification to the terminal 30. On the other hand, when a conference with a VIP is held at a location far away from the installation location of the camera device 10-3, the server device 20 may delay the transmission of the VIP visit notification while securing a sufficient time for the reception person to arrive at the conference location.

In the above example embodiment, the case where the camera device 10 transmits image data to the server device 20 periodically or at a predetermined timing has been described. However, when the image data includes a vehicle number or a face area, the camera device 10 may transmit the image data to the server device 20.

In the above example embodiment, the case where the VIP visit notification is transmitted to the terminal 30 used by the reception person has been described. However, the notification may be transmitted to a digital signage that can be visually recognized from the entire workplace, and the reception person may be notified of the visit of the VIP via the digital signage. Alternatively, the reception person may be notified of the visit of the VIP using a speaker or the like.

Normally, when a VIP visits, a plurality of persons (VIP, Executive, Clerk, Driver) are often on board in one vehicle. The visitor notification system may include a configuration for accurately identifying a VIP among the plurality of persons. For example, when detecting a plurality of persons in the image data acquired from the camera device 10-2, the server device 20 (biological information acquisition unit 204) extracts face images of the respective plurality of persons. Further, the server device 20 transmits the extracted face image to the terminal 30 of the reception person to the VIP specified from the vehicle number. The terminal 30 displays a GUI for designating VIP together with the received face image. The reception person selects the face of the VIP from the plurality of face images. The terminal 30 transmits the face image of the selected VIP to the server device 20. The server device 20 treats the face image received from terminal 30 as a VIP face image, and registers the biological information in the visitor database. Alternatively, the biological information acquisition unit 204 may acquire biological information on a VIP depending on where to get off the vehicle (the position of the door). For example, the biological information acquisition unit 204 may treat a person getting off the rear seat side door as a VIP and acquire the biological information.

Alternatively, when a plurality of persons get off one vehicle, the server device 20 may treat one of the plurality of persons as a "VIP" and use the "VIP" to determine whether the person has passed through a predetermined point (installation place of the camera device 10-3). This is because a companion of a VIP or the like can be substantially regarded as a visit of a VIP. That is, the server device 20 may transmit the VIP visit notification to the terminal 30 when tracking (tracking of the camera device 10-2 and the camera device 10-3) of a person who gets off a predetermined vehicle (a vehicle registered as a VIP vehicle in advance) is successful.

In the above example embodiment, the server device 20 acquires a face image of a person who gets off the vehicle and treats the acquired person as a VIP. However, in a case where a face image is not able to be acquired, for example, the server device 20 may acquire body shape information instead of the face image. The server device 20 extracts the body shape information of the person who gets off the vehicle from the image obtained from the camera device 10-2. The server device 20 stores the extracted body shape information as body shape information of the VIP. When the image data obtained from camera device 10-3 includes body shape information of a VIP, the server device 20 determines that the VIP passes through a predetermined point, and transmits a VIP visit notification to the terminal 30.

In the above example embodiment, when a person recognized as a VIP passes through a predetermined point (a location where the camera device 10-3 is installed), the server device 20 transmits a VIP visitor notification to the terminal 30. However, the server device 20 may analyze the image data from the camera device 10-2, and transmit the VIP visitor notification to the terminal 30 in response to registration of the biological information of the VIP in the visitor database. The terminal that has received the notification considers the distance (moving time) from the dedicated parking lot (installation location of the camera device 10-2) to the meeting room, and may output a message saying "A VIP has come to the company. It would be scheduled to arrive at the meeting room within A minutes. Please prepare".

In the above example embodiment, a case has been described in which a person getting off a specific vehicle is treated as a VIP, and the VIP visitor notification is transmitted to the reception person. However, the VIP visitor notification (visitor notification) may be notified to the reception person even when a person other than VIP is recognized. That is, the server device 20 may recognize a person (a normal guest who is not able to be said as a VIP) who gets off the vehicle registered in advance, and transmit the visitor notification to the reception person when the person reaches a predetermined location.

In the flow diagram (flowchart and sequence diagram) used in the above description, a plurality of steps (processes) are described in order, but the execution order of the steps executed in the example embodiment is not limited to the described order. In the example embodiment, for example, the order of the illustrated steps can be changed within a range in which there is no problem in terms of content, such as executing each process in parallel.

The above example embodiments have been described in detail in order to facilitate understanding of the disclosure of the present application, and it is not intended that all the configurations described above are necessary. In a case where a plurality of example embodiments has been described, each example embodiment may be used alone or in combination. For example, a part of the configuration of the example embodiment can be replaced with the configuration of another example embodiment, or the configuration of another example embodiment can be added to the configuration of the example embodiment. Furthermore, it is possible to add, delete, and replace other configurations for a part of the configuration of the example embodiment.

Although the industrial applicability of the present invention is apparent from the above description, the present invention can be suitably applied to a visitor notification system that receives VIPs at a company or the like.

Some or all of the above example embodiments may be described as the following Supplementary Notes, but are not limited to the following.

Supplementary Note 1

A server device including:
a database that stores visitor information including at least vehicle information of a vehicle used when a VIP visits and reception person information including at least information of a reception person who responds to the VIP in association with each other;
a determination unit that determines whether a vehicle entering a parking lot is a vehicle carrying the VIP based on image data obtained from a first camera device and the vehicle information;
an acquisition unit that acquires, by using image data obtained from a second camera device, biological information on a person who has got off a vehicle that has been determined to be a vehicle carrying the VIP, and stores the acquired biological information in the database as biological information on the VIP; and
a notification unit that performs biometric authentication using biological information generated based on image data obtained from a third camera device and biological information stored in the database, and when the authentication of the VIP who moves to a predetermined location is successful, notifies the reception person relevant to the VIP who has succeeded in the authentication of the visit of the VIP.

Supplementary Note 2

The server device according to Supplement Note 1, in which
the vehicle information is a vehicle number of a vehicle used when the VIP visits, and
when the image data obtained from the first camera device includes the vehicle number stored in the database, the determination unit determines that the vehicle entering the parking lot is a vehicle carrying the VIP.

Supplementary Note 3

The server device according to Supplement Note 1 or 2, in which the notification unit transmits a VIP visit notification to a terminal used by the reception person.

Supplementary Note 4

The server device according to any one of Supplement Notes 1 to 3, further including:
an entry management unit that deletes an entry of the database relevant to a VIP who has arrived at the predetermined location.

Supplementary Note 5

The server device according to Supplement Note 4, in which the entry management unit determines whether the VIP arrives at the predetermined location by biometric authentication using biological information generated based on image data obtained from a fourth camera device and biological information stored in the database.

Supplementary Note 6

The server device according to any one of Supplement Notes 1 to 5, in which
the database stores the vehicle information and personal information of the VIP who visits in association with each other, and
the acquisition unit transmits personal information of the VIP relevant to the vehicle carrying the VIP to a signage when the acquisition unit is able to acquire biological information of a person who gets off a vehicle determined as a vehicle carrying the VIP.

Supplementary Note 7

The server device according to Supplement Note 6, in which
the database stores the visitor information and the reception person information in association with information on the predetermined location, and
the acquisition unit transmits, to the signage, information on the predetermined location relevant to a vehicle carrying the VIP when biological information on a person who has got off from a vehicle determined as a vehicle carrying the VIP is acquired.

Supplementary Note 8

The server device according to any one of Supplement Notes 1 to 7, in which the notification unit notifies the reception person of a visit of the VIP after a lapse of a predetermined period from successful authentication of the VIP.

Supplementary Note 9

The server device according to Supplement Note 3, in which the notification unit transmits the VIP visit notification including biological information of the VIP to the terminal.

Supplementary Note 10

The server device according to any one of Supplement Notes 1 to 9, in which
the first camera device is installed so as to be capable of capturing an image of a vehicle entering the parking lot,
the second camera device is installed so as to be capable of capturing an image of a person getting off an alighting station of the parking lot, and
the third camera device is installed so as to be capable of capturing an image of a person passing through a route from the alighting station to the predetermined location.

Supplementary Note 11

The server device according to any one of Supplement Notes 1 to 10, in which the biological information is information regarding a face of a person.

Supplementary Note 12

The server device according to any one of Supplement Notes 1 to 11, in which the acquisition unit notifies the reception person of occurrence of an abnormal situation when biological information of a person who gets off a vehicle determined as a vehicle carrying the VIP is not able to be acquired.

Supplementary Note 13

The server device according to any one of Supplement Notes 1 to 11, in which when authentication of the VIP who moves to the predetermined location is not successful, the notification unit notifies the reception person of occurrence of an abnormal situation.

Supplementary Note 14

A visitor notification system including:
first to third camera devices; and
a server device connected to the first to third camera devices, wherein
the server device includes:
a database that stores visitor information including at least vehicle information of a vehicle used when a VIP visits and reception person information including at least information of a reception person who responds to the VIP in association with each other;
a determination unit that determines whether a vehicle entering a parking lot is a vehicle carrying the VIP based on image data obtained from the first camera device and the vehicle information;
an acquisition unit that acquires, by using image data obtained from the second camera device, biological information on a person who has got off a vehicle that has been determined to be a vehicle carrying the VIP, and stores the acquired biological information in the database as biological information on the VIP; and
a notification unit that performs biometric authentication using biological information generated based on image data obtained from the third camera device and biological information stored in the database, and when the authentication of the VIP who moves to a predetermined location is successful, notifies the reception person relevant to the VIP who has succeeded in the authentication of the visit of the VIP.

Supplementary Note 15

A visitor notification method that is performed in a server device including a database to store visitor information including at least vehicle information of a vehicle used when a VIP visits and reception person information including at least information of a reception person who responds to the VIP in association with each other, the visitor notification method including:
determining whether a vehicle entering a parking lot is a vehicle carrying the VIP based on image data obtained from a first camera device and the vehicle information;
acquiring, by using image data obtained from a second camera device, biological information on a person who has got off a vehicle that has been determined to be a vehicle carrying the VIP, and storing the acquired biological information in the database as biological information on the VIP; and
performing biometric authentication using biological information generated based on image data obtained from a third camera device and biological information stored in the database, and when the authentication of the VIP who moves to a predetermined location is successful, notifying the reception person relevant to the VIP who has succeeded in the authentication of the visit of the VIP.

Supplementary Note 16

A non-transitory computer-readable storage medium storing a program for causing a computer installed in a server device including a database to store visitor information including at least vehicle information of a vehicle used when a VIP visits and reception person information including at least information of a reception person who responds to the VIP in association with each other, to execute:

determining whether a vehicle entering a parking lot is a vehicle carrying the VIP based on image data obtained from a first camera device and the vehicle information;
acquiring, by using image data obtained from a second camera device, biological information on a person who has got off a vehicle that has been determined to be a vehicle carrying the VIP, and storing the acquired biological information in the database as biological information on the VIP; and
performing biometric authentication using biological information generated based on image data obtained from a third camera device and biological information stored in the database, and when the authentication of the VIP who moves to a predetermined location is successful, notifying the reception person relevant to the VIP who has succeeded in the authentication of the visit of the VIP.

The disclosures of the cited prior art documents are incorporated herein by reference. Although the example embodiments of the present invention have been described above, the present invention is not limited to these example embodiments. It will be understood by those of ordinary skill in the art that these example embodiments are exemplary only and that various variations are possible without departing from the scope and spirit of the present invention. That is, it goes without saying that the present invention includes various modifications and corrections that can be made by those of ordinary skill in the art in accordance with the entire disclosure including the claims and the technical idea.

REFERENCE SIGNS LIST 10, 10-1 to 10-4 camera device
20, 100 server device
30, 30-1, 30-2 terminal
40 signage
101 database
102 determination unit
103 acquisition unit
104 notification unit
201 communication control unit
202 pre-registration unit
203 vehicle determination unit
204 biological information acquisition unit
205 visitor notification unit
206 storage unit
207 entry management unit
311 processor
312 memory
313 input/output interface
314 communication interface

What is claimed is:

1. A server device comprising:
a database that stores visitor information including at least vehicle information of a vehicle used when a very important person (VIP) visits and reception person information including at least information of a reception person who responds to the VIP in association with each other;
at least one memory storing a set of instructions; and
at least one processor configured to execute the set of instructions to:
determine whether a vehicle entering a parking lot is a vehicle carrying the VIP based on image data obtained from a first camera device and the vehicle information;
acquire, by using image data obtained from a second camera device, biological information on a person who has got off a vehicle that has been determined to be the vehicle carrying the VIP, and store the acquired biological information in the database as biological information on the VIP; and
perform biometric authentication using biological information generated based on image data obtained from a third camera device and biological information stored in the database, and when the authentication of the VIP who moves to a predetermined location is successful, notify the reception person relevant to the VIP who has succeeded in the authentication of the visit of the VIP, wherein
the database stores the vehicle information and personal information of the VIP who visits in association with each other,
the at least one processor is further configured to execute the instructions to transmit personal information of the VIP relevant to the vehicle carrying the VIP to signage when the at least one processor is able to acquire biological information of a person who gets off a vehicle determined as the vehicle carrying the VIP,
the database stores the visitor information and the reception person information in association with information on the predetermined location, and
the at least one processor is further configured to execute the instructions to transmit, to the signage, information on the predetermined location relevant to the vehicle carrying the VIP when the biological information on the person who has got off from the vehicle determined as the vehicle carrying the VIP is acquired.

2. The server device according to claim 1, wherein the vehicle information is a vehicle number of a vehicle used when the VIP visits, and
the at least one processor is further configured to execute the instructions to
when the image data obtained from the first camera device includes the vehicle number stored in the database, determine that the vehicle entering the parking lot is the vehicle carrying the VIP.

3. The server device according to claim 1, wherein the at least one processor is further configured to execute the instructions to transmit a VIP visit notification to a terminal used by the reception person.

4. The server device according to claim 1,
wherein the at least one processor is further configured to execute the instructions to delete an entry of the database relevant to a VIP who has arrived at the predetermined location.

5. The server device according to claim 4, wherein the at least one processor is further configured to execute the instructions to determine whether the VIP arrives at the predetermined location by biometric authentication using biological information generated based on image data obtained from a fourth camera device and biological information stored in the database.

6. The server device according to claim 1, wherein the at least one processor is further configured to execute the instructions to notify the reception person of a visit of the VIP after a lapse of a predetermined period from successful authentication of the VIP.

7. The server device according to claim 3, wherein the at least one processor is further configured to execute the instructions to transmit the VIP visit notification including biological information of the VIP to the terminal.

8. The server device according to claim 1, wherein
the first camera device is installed so as to be capable of capturing an image of a vehicle entering the parking lot,
the second camera device is installed so as to be capable of capturing an image of a person getting off an alighting station of the parking lot, and
the third camera device is installed so as to be capable of capturing an image of a person passing through a route from the alighting station to the predetermined location.

9. The server device according to claim 1, wherein the biological information is information regarding a face of a person.

10. The server device according to claim 1, wherein the at least one processor is further configured to execute the instructions to notify the reception person of occurrence of an abnormal situation when biological information of a person who gets off a vehicle determined as the vehicle carrying the VIP is not able to be acquired.

11. The server device according to claim 1, wherein the at least one processor is further configured to execute the instructions to, when authentication of the VIP who moves to the predetermined location is not successful, notify the reception person of occurrence of an abnormal situation.

12. A visitor notification system including the server device according to claim 1, comprising:
the first to third camera devices, wherein
the server device is connected to the first to third camera devices.

13. A visitor notification method that is performed in a server device including a database to store visitor information including at least vehicle information of a vehicle used when a very important person (VIP) visits and reception person information including at least information of a reception person who responds to the VIP in association with each other, the visitor notification method comprising:
determining whether a vehicle entering a parking lot is a vehicle carrying the VIP based on image data obtained from a first camera device and the vehicle information;
acquiring, by using image data obtained from a second camera device, biological information on a person who has got off a vehicle that has been determined to be the vehicle carrying the VIP, and storing the acquired biological information in the database as biological information on the VIP; and
performing biometric authentication using biological information generated based on image data obtained from a third camera device and biological information stored in the database, and when the authentication of the VIP who moves to a predetermined location is successful, notifying the reception person relevant to the VIP who has succeeded in the authentication of the visit of the VIP,
the database stores the vehicle information and personal information of the VIP who visits in association with each other,
the visitor notification method further comprises transmitting personal information of the VIP relevant to the vehicle carrying the VIP to signage when the at least one processor is able to acquire biological information of a person who gets off a vehicle determined as the vehicle carrying the VIP,
the database stores the visitor information and the reception person information in association with information on the predetermined location, and
the visitor notification method further comprises transmitting, to the signage, information on the predetermined location relevant to the vehicle carrying the VIP when the biological information on the person who has got off from the vehicle determined as the vehicle carrying the VIP is acquired.

14. A non-transitory computer-readable storage medium storing a program executable by a computer to perform processing, wherein
the computer is installed in a server device including a database to store visitor information including at least vehicle information of a vehicle used when a very important person (VIP) visits and reception person information including at least information of a reception person who responds to the VIP in association with each other,
the processing comprises:
determining whether a vehicle entering a parking lot is a vehicle carrying the VIP based on image data obtained from a first camera device and the vehicle information;
acquiring, by using image data obtained from a second camera device, biological information on a person who has got off a vehicle that has been determined to be the vehicle carrying the VIP, and storing the acquired biological information in the database as biological information on the VIP; and
performing biometric authentication using biological information generated based on image data obtained from a third camera device and biological information stored in the database, and when the authentication of the VIP who moves to a predetermined location is successful, notifying the reception person relevant to the VIP who has succeeded in the authentication of the visit of the VIP,
the database stores the vehicle information and personal information of the VIP who visits in association with each other,
the processing further comprises transmitting personal information of the VIP relevant to the vehicle carrying the VIP to signage when the at least one processor is able to acquire biological information of a person who gets off a vehicle determined as the vehicle carrying the VIP,
the database stores the visitor information and the reception person information in association with information on the predetermined location, and
the processing further comprises transmitting, to the signage, information on the predetermined location relevant to the vehicle carrying the VIP when the biological information on the person who has got off from the vehicle determined as the vehicle carrying the VIP is acquired.

* * * * *